United States Patent Office 2,941,615
Patented June 21, 1960

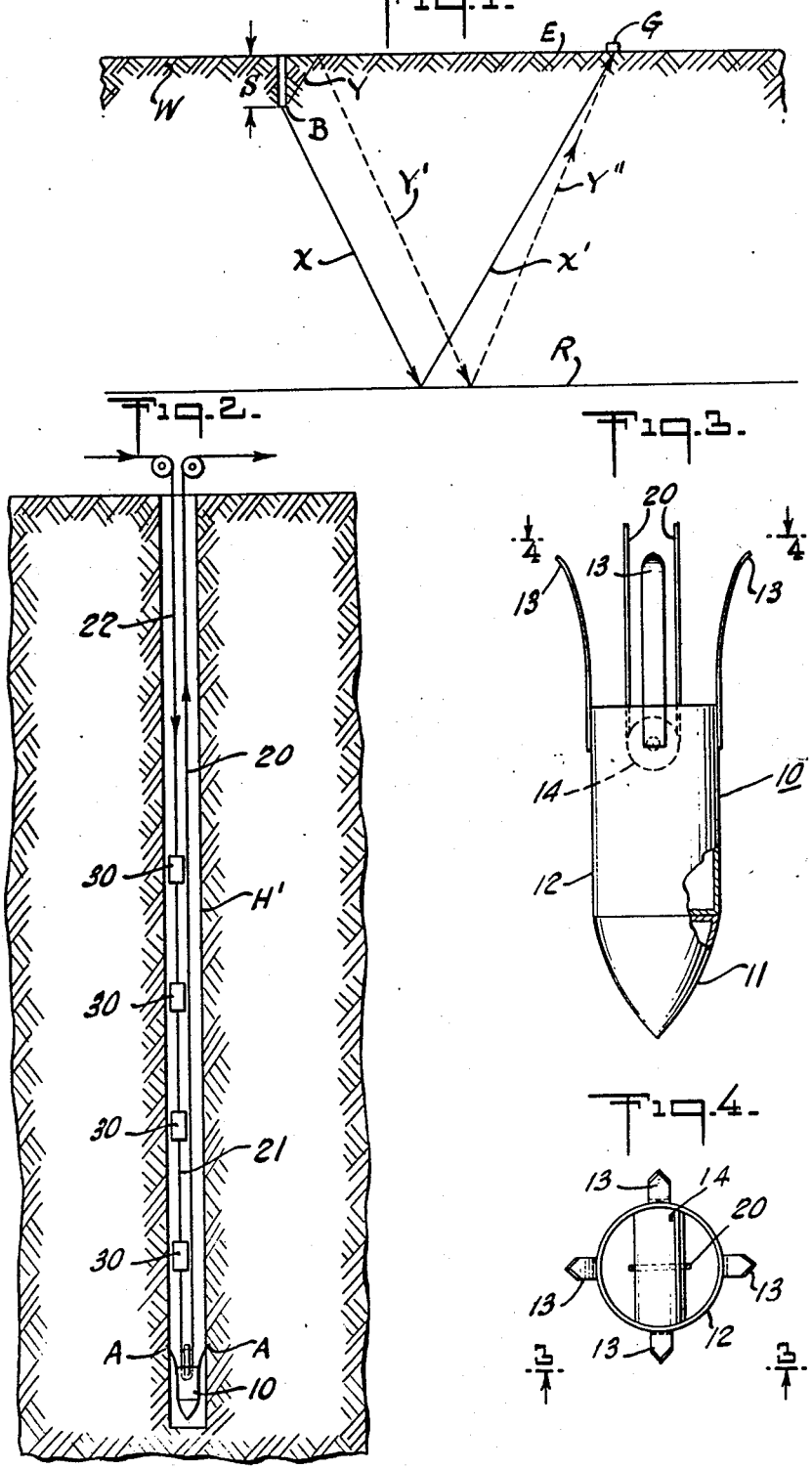

2,941,615

DEVICE FOR LOADING TANDEM CHARGE ARRAYS

Thomas H. Holmes, Madill, Okla., assignor to Texaco Inc., a corporation of Delaware Filed May 1, 1956, Ser. No. 581,966

4 Claims. (Cl. 181—.5)

This invention relates generally to geophysical exploration and more particularly to a device for loading tandem charge arrays in a shot hole for sequential shooting during seismic exploration work.

In seismic reflection surveying, depths of underground geophysical formations are determined by measurement of the time intervals which elapse between the generation and the reception of reflected seismic waves, artificially created by the explosion of a charge beneath the earth's surface.

As usually practiced, a charge of explosive is set off beneath the surface of the earth at a point known as the shot point, located below the so-called weathered or low velocity layer, an unconsolidated surface formation usually 10–120 feet deep, although varying up to two or three times as much, through which the velocity of the seismic wave is substantially less than normal. After the explosion, the seismic waves which emanate from the shot point, together with the reflections from underlying substrata, are picked up by geophones, devices provided with means for converting mechanical vibrations imparted to the earth by seismic waves into electrical impulses. Each geophone is connected to a suitable circuit for electrical amplification into a recording system from which can be determined the existence, location and attitude of underlying reflecting subsurface formations.

Techniques for more ready detection and identification on the seismic record of reflected seismic waves are covered by U.S. Patent No. 1,998,412 and are the subject of the commonly assigned U.S. patent application, Serial No. 424,200, now Patent No. 2,908,342, which is directed to a method of eliminating delayed "ghost" reflected waves by means of sequential detonations of seismic explosions.

The fact that sequential detonation operations have not been accepted more widely by the industry is due probably to the awkward, slow and, at times, dangerous shot hole loading procedures which require the positioning of explosive charges at definite spacings in the shot hole, together with igniting means including Primacord and electrical blasting caps, the hole frequently being filled with liquid. After first being secured to a rope, such an assembly is then lowered into the hole, the end of the rope having been weighted with scrap window sash weights or concrete filled cans, both of which are cumbersome to carry around in large numbers in work vehicles. Loading in this manner requires an open shot hole with little or no friction between the charges and the wall of the hole.

Accordingly, it is an object of this invention to provide an improved means for loading tandem charge arrays in shot holes for use in sequential shooting.

Another object of this invention is to provide a simple and inexpensive device by which a tandem charge array may be accurately located within a shot hole.

Still another object of this invention is to provide an improved means by which tandem charge arrays are loaded into a shot hole with ease and with decreased danger.

These and other objects, features and advantages of this invention will become apparent from the following description and claims when read in conjunction with the accompanying drawings wherein:

Fig. 1 is a diagrammatic sketch showing the paths of several seismic waves originating from a single charge and received by the geophone;

Fig. 2 is a diagrammatic vertical sectional view of a shot hole loaded for sequential shooting showing the improved anchoring device in operative position;

Fig. 3 is an expanded vertical cross section of the device taken along line 3—3 of Fig. 4; and Fig. 4 is a cross section of the device taken along line 4—4 of Fig. 3.

I have discovered an expendable device which can be fastened to the wall at the bottom of a shot hole to provide anchor means for the accurate location therein of a tandem charge array for sequential firing.

Referring now to Fig. 1 of the drawings, the air-ground interface of the earth's surface is indicated at E, with a shot hole H shown extending within the earth's surface, a distance indicated as S. In seismic exploration using the reflection method, high explosive is detonated at the bottom of the shot hole, at the shot point B. Seismic waves created by the resulting explosion travel outwardly from the shot point at B and are received and detected by geophones, one of which is indicated at G, located on the earth's surface some distance from the shot hole H. The seismic waves received and detected by the geophone include the reflected wave moving along path X', created by the reflection of a seismic wave from shot point B and moving along path X, striking the underground reflecting surface at R. Also indicated in Fig. 1 is the formation of a "ghost" reflected wave which starts as an upwardly directed seismic wave moving along the path Y until it strikes some reflecting horizon such as the air-ground interface E or the bottom of the low velocity weathered layer at W. Upon reaching this reflecting surface, a part of the seismic wave travelling along the path Y is reflected back into the earth along the path indicated by the broken line Y' and this reflected wave in turn is partly reflected by the subsurface reflecting horizon R back to the geophone G along the path Y''.

The exact position in the shot hole of the charge whose explosion will generate the seismic shock wave should be known in order to locate the reflecting surfaces exactly. With reference to Fig. 2 of the drawing, at H' there is shown a shot hole with a diagrammatic positioning of a tandem charge array including my improved anchoring device, indicated generally at 10, together with the positioning cord or small rope at 20, and a series of spaced charges indicated generally at 30, connected together by Primacord, 21, used to set these charges off by firing line 22. As is well-known in the art, these charges are of a definite weight and their spacing is fixed exactly by the lengths of Primacord in order that the seismic waves reflected from their explosions may be utilized with the best efficiency.

The improved anchoring means 10 is disclosed in the cross sections shown in Figs. 3 and 4, and comprises a pointed shaped nose portion, indicated at 11, joined to one end of a cylindrical cross section, hollow body portion 12, at the opposite end of which are attached a number of outwardly sprung flat anchor members or prongs 13, having pointed ends thereon and shown as four in number. Also, adjacent the top part of the body portion, there is a round transverse cylindrical support member 14, whose function will be described later.

In the practice of this invention, it is proposed to insert the anchoring device into the shot hole with the nose portion leading. The nose portion 11 need not be weighted since the anchoring device is positioned in the shot hole by pushing it down into the hole with loading poles or by the use of a loading weight of an amount sufficient to lower the device into the shot hole and/or sink it in the liquid which may seep into the hole. With the improved anchoring device when the bottom or desired level in the shot hole is reached, the device is anchored by pulling the heavy cord 20 upwardly so that the outwardly sprung anchor prongs 13 are embedded into the wall of the hole as indicated at A in Fig. 2. After anchoring, the free end of the cord is pulled up and is used to determine the exact location of the charge array which is fastened to the other end of the cord and then pulled down into position. Upon the explosion of the charges, the anchoring device may be lost, but due to its inexpensive construction, such as an anticipated loss is negligible.

This improved anchoring device has been found to offer distinct advantages over other prior art devices used in shot hole loading of a multiple, vertically positioned charge array. No weight need be attached to the charge array in order to position it in the shot hole. The improved device allows positive and accurate positioning without excessive handling of dangerous explosive materials. While a round cross member 14 is used, it should be evident that a pulley type structure may be mounted on the device for use in positioning the charge array.

It is obvious that various changes in details may be made within the scope of the claims without departing from the spirit of my invention. It is to be understood, therefore, that my invention is not to be limited to the specific details herein described.

I claim:

1. In an apparatus for use in seismic reflection surveying, anchor means for locating an explosive charge array adapted to be positioned in a shot hole comprising a device having a rounded cross section hollow body portion with a shaped end portion having a matching cross-section at the junction with said body portion, the opposite end of said hollow body portion having a transverse cylindrical support member, and wall engaging spring members secured to said opposite end and flaring outwardly from said device, the free ends of said spring members being adapted to penetrate the wall of said shot hole to prevent substantial upward movement of said device therein, said support member serving as a purchase by which said wall-engaging spring members are embedded and towards which said charge array is pulled for positioning within said shot hole.

2. The invention in accordance with claim 1 wherein said hollow body portion is cylindrical in shape.

3. The invention in accordance with claim 2 wherein said shaped end portion is pointed in configuration.

4. The invention in accordance with claim 3 wherein said wall engaging spring members are flat with pointed ends thereon.

References Cited in the file of this patent

UNITED STATES PATENTS

| | | |
|---|---|---|
| 753,394 | Hector | Mar. 1, 1904 |
| 1,153,450 | Schaff | Sept. 14, 1915 |
| 2,096,970 | Lesh | Oct. 26, 1937 |
| 2,164,690 | Struzik | July 4, 1939 |
| 2,450,366 | Williams | Sept. 28, 1948 |
| 2,490,378 | Mount | Dec. 6, 1949 |
| 2,491,692 | Shimek | Dec. 20, 1949 |
| 2,755,878 | Smith | July 24, 1956 |

FOREIGN PATENTS

| | | |
|---|---|---|
| 75,862 | Austria | Mar. 26, 1919 |